P. H. HAMILTON.
GAS BURNER FOR WATER HEATERS.
APPLICATION FILED MAR. 6, 1918.
1,354,295.
Patented Sept. 28, 1920.
3 SHEETS—SHEET 1.
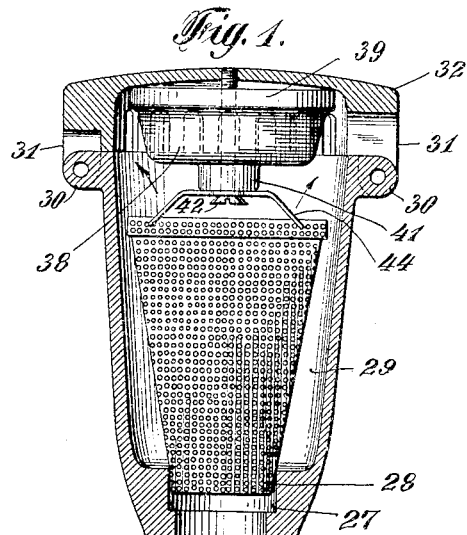
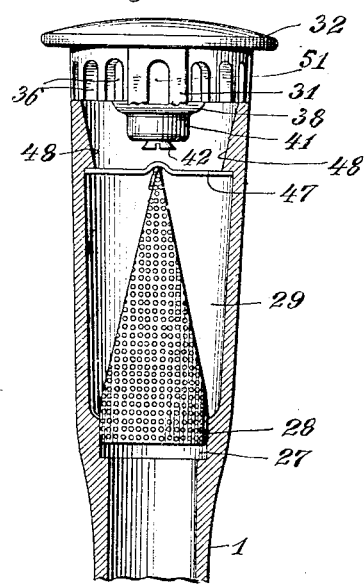
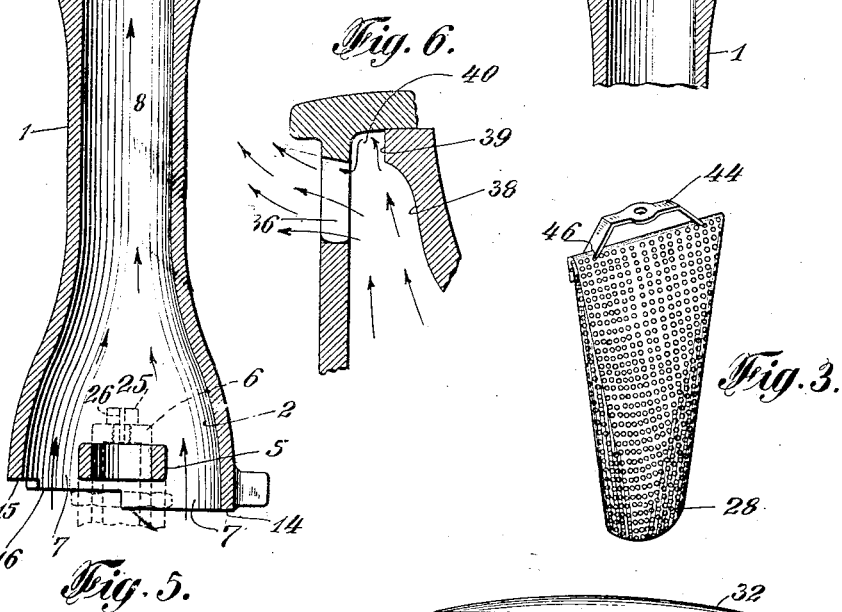
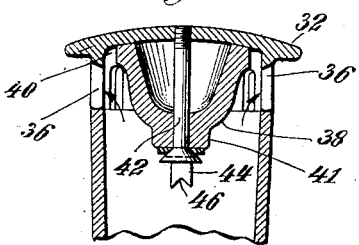
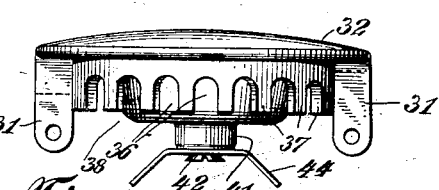
INVENTOR
Paul H Hamilton
BY
George Ramsey
ATTORNEYS

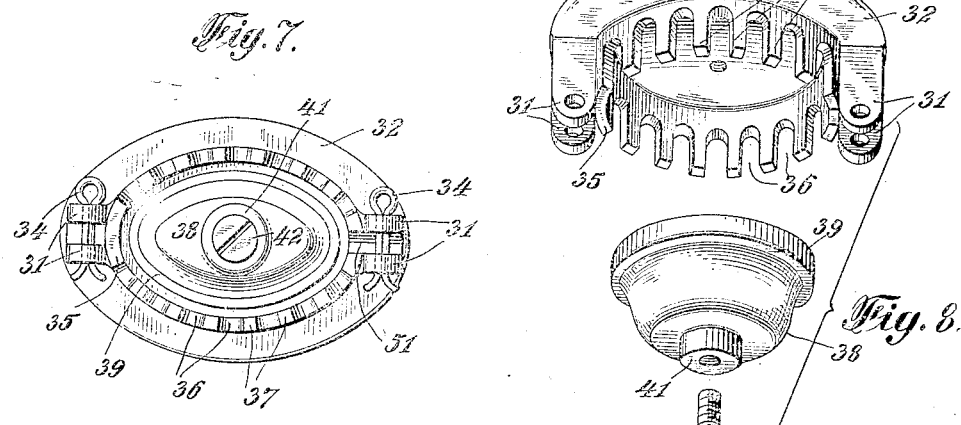
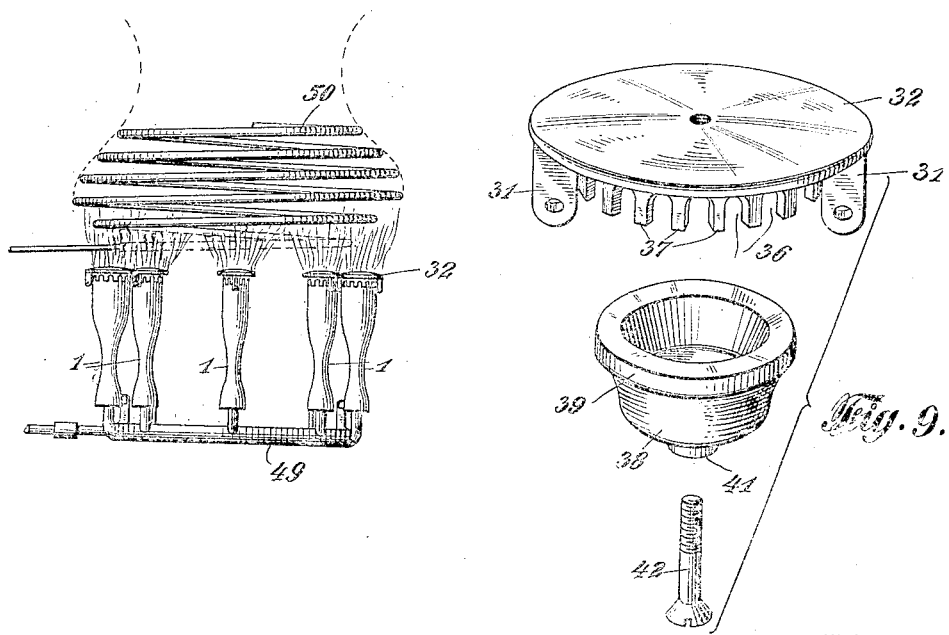

P. H. HAMILTON.
GAS BURNER FOR WATER HEATERS.
APPLICATION FILED MAR. 6, 1918.
1,354,295.
Patented Sept. 28, 1920.
3 SHEETS—SHEET 3.
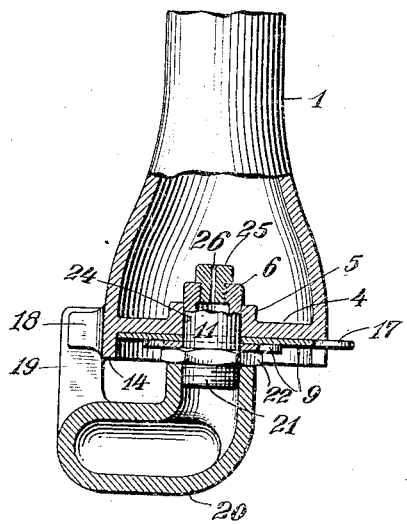
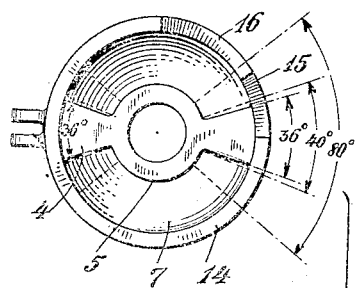
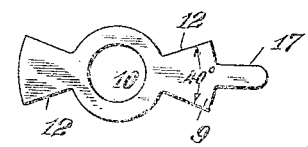
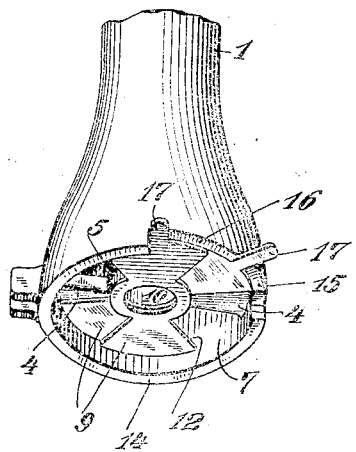
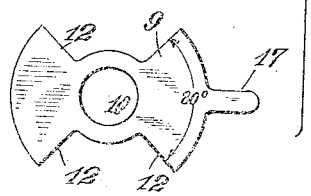
INVENTOR
Paul H. Hamilton
BY
George Ramsey
ATTORNEYS

UNITED STATES PATENT OFFICE.

PAUL H. HAMILTON, OF NEW YORK, N. Y., ASSIGNOR TO ESDA MANUFACTURING COMPANY, OF NEW YORK, N. Y., A CORPORATION OF DELAWARE.

GAS-BURNER FOR WATER-HEATERS.

1,354,295.

Specification of Letters Patent.  Patented Sept. 28, 1920.

Application filed March 6, 1918. Serial No. 220,715.

*To all whom it may concern:*

Be it known that I, PAUL H. HAMILTON, a citizen of the United States, and a resident of the city of New York, in the county and State of New York, have invented certain new and useful Improvements in Gas-Burners for Water-Heaters, of which the following is a specification.

This invention relates broadly to gas burners and more particularly to a gas burner adapted for automatically operated water heaters.

The principal object of the present invention is to provide for the efficient mixing of air and gas and to prevent "back burning" of the mixture by providing a cold mixing screen in a relatively large expansion chamber adjacent the burner head.

Another object of the present invention is a burner as specified wherein a hot spreader plate is provided above the cold screen and adjacent the exit of the mixture from the burner head.

A still further object of the present invention is to provide a burner of the character previously set out and further comprising a heated spreader bulb adjacent the hot spreader plate whereby the mixture is gradually warmed as it approaches the exit openings.

A still further and important object of the present invention is a burner comprising a relatively long vertical body portion having air and gas inlets at the lower end thereof with a vertical commingling tube leading to a mixing screen comprising a cylindrical tube having one end flattened and folded upon itself with the said tube extending into a mixing chamber above which is provided a burner head having outlet openings for the mixture.

Another object of this invention is a burner of the type specified wherein the internal conduit in the body portion is of a conformation comprising a relatively large diameter chamber in the base of the burner, an elongated tapering tube leading upward therefrom to a relatively large mixing chamber; the upward length of this system is such as to produce the proper rate of flow of the combustion mixture as it issues from the burner head or top.

A still further object of the present invention is a burner as specified in the previous paragraph and with the axis of the mixing screen substantially parallel to the axis of the commingling tube.

A more specific object of the present invention is to provide a burner of the character specified wherein the burner head is attachable to and detachable from the body of the burner without use of screws or machined parts.

A still further and equally important object of the present invention is the provision of detachable plates formed in pairs and of graduated sizes whereby the air inlet may be definitely and accurately controlled.

Other and further objects of the present invention will in part be obvious and will in part be pointed out hereinafter in the specification following by reference to the accompanying drawings wherein like parts are designated by like characters throughout the several figures thereof.

Figure 1 is an elevational view of the burner showing the body portion in section.

Fig. 2 is a detail view showing the burner head with a transverse section through the body portion and a modified form of screen holder.

Fig. 3 is a perspective view of the screen.

Fig. 4 is a side elevation of the burner head removed from the body portion.

Fig. 5 is a detail view showing a transverse section through the burner head.

Fig. 6 is an enlarged detail view of one side of the burner head.

Fig. 7 is a bottom plan view of the burner head.

Fig. 8 is a bottom perspective view of the burner head with the parts disassembled.

Fig. 9 is a top perspective view of the burner head with the parts disassembled as in Fig. 8.

Fig. 10 illustrates an arrangement of burners beneath a portion of the water heater coil.

Fig. 11 is a bottom perspective view of the base with the air regulator plates in position.

Fig. 12 illustrates sets of air regulator plates.

Fig. 13 is a section through a portion of the gas ring forming the burner base, and illustrates the gas "spud" and "orifice."

Various types of gas burners including mixing screens are old in the art of water heaters and in common use. General types of these burners for water heaters comprise flat screens clamped between a side of the burner head and the body of the tube; and cylindrical screens connected to the spreader plate or cap and arranged immediately adjacent the outlet opening for the mixture. In burner heads of this type the screen becomes heated when the burner has been used any length of time and combustion begins in the space between the screen and the outlet openings in the burner head, which further heats the burner head and body to such an extent that frequently the screen acts as a "hot-tube" and flareback occur that carry the flame down to the primary gas inlet where the gas is first admitted to the burner. Where this happens the gas burns directly at the emission nipple, and if there is even a very slight leakage, or if the heater is again immediately used "back burning" under full gas head takes place. Under the above conditions combustion is incomplete and both poisonous and explosive gases are emitted unburned from the burner head. This is very serious when the burner is in use in an automatic heater that is distant from the operator and is presumed to function without requiring any especial attention. Furthermore the heat of the burner is so remote from the point of desired application as to render the burner substantially useless. There is also a common type of burner having a tip or burner head provided with an over hanging ledge and combustible mixture openings directly under a ledge so that the flames are in contact with the ledge and issue parallel one to another. This construction tends to heat the ledge and thus reduce the heat of the flame jets, and also the parallel flame jets tend to "lap" which reduces the effective action of secondary air (or air around the flame); this further affects the efficiency of the burner. The ideal burner is one which enables all of the gas heat units to be applied at a predetermined point of application. This ideal condition means complete combustion of the gas at a definite predetermined location and without any danger of "flare-back."

The present invention overcomes the difficulties of the known prior art by providing a burner wherein the gas and air are thoroughly and completely mixed by a relatively cold screen, which serves also as a safety screen, in a relatively large expansion and mixing chamber from which the combustible mixture is led through a heating zone to the outlet opening, the temperature of which is always maintained far below the ignition point of the mixture. The vertical height of the burner is such that the upward flow gives considerable velocity to the gas, due to its low specific gravity, and its velocity through the outlet openings is greater than the speed or rate of travel of combustion; this further assists in preventing "back firing." By the construction specified it will be noted that the gas is in a relatively cool condition until the burner head is reached. There the mixture is warmed and at this time the flow is so rapid that the flame does not burn back through the outlet openings. The flame openings are sufficiently below the shed to prevent flame contact therewith and these openings are radially disposed so that the flame jets diverge one from another thereby obviating "lapping" of the flames so that each flame jet is surrounded by free or secondary air (the primary air being the air mixed with the gas in the burner body to make up the combustible mixture) which insures complete combustion. By this construction a thoroughly uniform mixture is burned at the burner head, and the flames may be directed as desired, thereby substantially meeting ideal requirements. Furthermore, this invention contemplates regulating the air inlet ports by segmenets suited to the gas pressure on which the burner is to be used. While the gas pressures are different in different plants, the pressure on a given point of a plant is sufficiently near to constant to make permanent mixture adjustments not only satisfactory but desirable. The air regulator segments may comprise stampings of sheet metal with the wings of the segments subtending predetermined angles and being provided with an opening between the wings, which opening fits the spud. This construction permits a segment of the proper or required size to be dropped over the spud before the burner is set on the spud, and a small finger piece extending from the side of the burner enables the segment plate to be adjusted, whereby more or less of the air inlet is opened or closed, as is desired. Also if deemed desirable a plurality of these segmental plates may be used in conjunction with one another. In order to prevent any turning movement of the burner and in order to further facilitate maintaining the burner head at all times in the most effective position relative to the heating, an interlocking construction may be provided between the burner and some stationary part, for example the gas ring, and may comprise a pair of studs on the skirt of the burner and a post extending upwardly from the gas ring.

Referring now more particularly to the drawings, wherein is illustrated one embodiment of the present invention, the body portion 1 comprises an enlarged hollow base 2 which is provided with a cross-bar 4 that carries a collar 5 adapted to fit over a gas supply "spud" 6. The enlarged base 2 is provided with air inlet openings 7 which lead upwardly into a vertical bore 8 that comprises an injection tube through which flow of air is induced by the jet of gas. Preferably the cross bar 4 subtends an angle of thirty-six degrees on each side of the collar 5. The air inlet opening is preferably controlled by segment plates 9 which may be formed of stampings from sheet metal and which are provided with an opening 10 of the right size to easily slip over the cylindrical portion of the spud 6. The end portions 11 of the segment plates 9 comprise wings 12 which may be formed to subtend and cover various predetermined angular portions of the air inlet openings 7. Preferably the segments are made with two sizes of wings, one subtending forty degrees, and the other subtending eighty degrees. The side of the skirt 14 of the burner base 2 is cut away to provide a pair of regulating notches 15 and 16, with the height of the notch 15 substantially the same as the thickness of a segment plate. These segment plates are each provided with a finger piece 17 which is adapted to contact with the notch 15 or 16, as the case may be. In the operation of these segment plates a single plate with forty degree wings may be dropped in position over the spud 6 and the collar 5 of the burner set on the spud and over the segment plate, after which the plate may be adjusted if desired in such manner as to close one hundred and fifty-two degrees of the base of the burner. If it is found necessary to close more than this portion, the burner is removed from the spud and an eighty degree plate may be added to the forty degree plate already in position. This combination permits a maximum closing of three hundred and twelve degrees of the entire base and a minimum of one hundred and sixty degrees. These segment plates are very economical to manufacture, simple to adjust and effective in operation. Furthermore they require substantially no extra labor in the assembly of the device, since they fit over and coöperate with parts which are essential to other functions of the burner. In order to obviate any turning of the burner head in adjusting the segment plates and furthermore to at all times insure a predetermined position of the burner head, a pair of studs 18 are molded on the skirt 14 of the burner base, which studs are adapted to embrace a post 19 extending upwardly from the gas ring 20.

Referring again to the spud, it comprises a threaded portion 21 adapted to be screwed into the gas ring pipe 20 by the hexagonal nut 22 above which extends the cylindrical member 24. The end of this member 24 is tapped and an emission nipple or trade named "orifice" 25 is threaded therein. This "orifice" 25 is provided with a very small bore 26 through which the gas escapes. The axis of this bore is coincident with the axis of the body 1 of the burner, so the gas spreads upwardly and outwardly to mingle with the incoming air.

The upper end of the conduit 8 may be recessed, as at 27, to receive the lower part of a spreader screen 28, which may be formed of any well known material, but preferably comprises a foraminous copper plate made into the form of a cylinder and having the upper end of the cylinder flattened and folded upon itself, with the lower end of the cylinder substantially cylindrical. A mixing screen constructed in this manner presents side walls angularly disposed to the direction of the normal flow of the gas and air, so that an intimate mixing of the gas and air is effected without the impedance of the flow which would occur where the side walls are parallel to the normal flow, as in a cylindrical screen. This mixing screen also is so constructed as to form a safety screen should the gas be accidentally ignited under the burner head. In automatic gas water heaters the gas valve closes to shut off the gas supply when the water flow is stopped by closing a service valve. When the gas valve closes the flow through the burner body is quickly diminished and a preponderance of air in the mixture results. This causes the flame to flash back until stopped by the cold safety mixing screen. It will also be noted that the main support for the mixing screen is remote from the burner head and there is not danger of the heat from the burner head transforming this screen into a "hot tube."

The body portion of the burner is enlarged around the mixing screen to provide a mixing chamber 29 which forms a reservoir from which the combustible mixture is supplied to the burner head. The upper end of the body portion is preferably provided with outstanding wings 30 which are adjacent to the wings 31 on the shed 32, whereby this cap may be removably joined to the body 1 by means of cotter pins 34. The shed 32 is provided with an annular or elliptical skirt 35, in which is a series of openings 36 preferably in the nature of a series of arches separated by teeth or pillars 37. In instantaneous water heaters the incoming water-coils are cold, and the gas combustion takes place in a confined space so that the water produced by the chemical action of combustion is condensed on the cold coils and drops on the burners. Because of gas impurities this condensed water is more or less acid and the burner must be protected. This protection is provided by a canopy or shed 32, the over-all diameter of which is greater than the diameter or cross-section diameter of any part of the burner below this shed 32. Preferably the arches 36 do not extend upwardly for the entire width of the skirt 35, consequently an annular continuous wall is provided adjacent the flat portion of the shed. A further reason for terminating these arches short of the shed is to prevent direct contact of the flame jets with the shed. It will also be noted that flame jets from the arches are all divergent one from another to prevent lapping. This shed carries on its under side a spreader bulb 38, which preferably is formed hollow to prevent over-heating, and is provided with walls 39, which extend around substantially parallel to the interior of the skirt 35 and spaced apart therefrom to provide an annular groove 40. The side walls of the bulb 38 slope inwardly from the annular walls 39 and may terminate in the protuberance 41 in the center of which is an opening for the passage of the assembly screw 42 which secures the spreader bulb 38 to the shed 32. The bulb thus has a conoidal form which insures equal distribution of fuel to all of the jet apertures. In order to prevent the mixing screen 28 from being displaced from its seat during shipment or otherwise, a bridge 44 may be attached to the assembly screw 42 and be provided with notches 46 which rest on the top of the spreader screen 28, thus securely retaining the parts in position when the burner head is in place on the burner body, and the burner is being assembled in a heater, or in transit. This bridge 44 is of relative small metal mass so as to minimize as much as possible any heat conduction from the burner head to the mixing screen. Furthermore, the bridge, or holder 44, is positioned in the gas flow and is kept cool by the gas and air. A modification of this bridge is shown in Fig. 2, and comprises a spring wire 47 bearing at its middle portion on the top of the screen 28 with the ends caught under lugs 48 on the interior of the body.

In Fig. 10 is illustrated a preferred arrangement of the burners, where these burners are to be utilized in connection with automatic water heaters, and comprises the arrangement of the burners upon a gas supply ring 49 which is arranged beneath the water coils 50. Where the burners are to be utilized in this arrangement preferably a burner opening 51 is provided in the shed 32, over the inner wing 30, as shown in Figs. 1, 2 and 4. This burner is so designed as to produce almost perfect combustion where the burner is surrounded by free air, and therefore it is desirable when a plurality of burners of this type are used that the burners be so separated that the flame jets shall not overlap or impinge one against another.

Realizing that this invention may be carried out in structures differing somewhat from the specific embodiment herewith disclosed I desire that it be understood that this disclosure is representative and illustrative and not to be considered in the limiting sense.

Having thus described my invention what I claim is:

1. A burner of the character specified, comprising in combination a vertical body portion having gas and air inlets in the lower end thereof, said body portion being provided with a vertical commingling bore forming the passageway for the air and gas, a mixing screen covering the upper end of said commingling bore, said mixing screen comprising a cylinder having one end flattened and closed to provide upwardly and inwardly inclined walls, the upper part of said body portion being enlarged to form a mixing chamber around said mixing screen and out of contact therewith, and a burner head above said mixing screen and also out of contact therewith.

2. A burner of the character specified comprising in combination, a hollow vertical body portion, said body portion having a mixing chamber in the upper end thereof, a removable burner head closing said mixing chamber, a mixing screen within said mixing chamber and out of contact therewith, and means carried by the burner head and engaging the screen whereby displacement of said screen is prevented when said burner head is in position on said body portion.

3. In a burner of the character specified a body portion having an upwardly extending bore, said body portion being provided with a bell-shaped base, said bore leading to a mixing chamber in the upper end of said body portion and having an oval cross-section larger than said bore, a mixing screen in said chamber, the lower end of said mixing screen being substantially cylindrical and being inserted in the upper end of said bore, the top of said screen being flattened and the sides of said screen being sloping, and an apertured burner head above said body portion.

4. A gas burner comprising a tubular body member having its lower portion formed as an entrance chamber, its upper portion formed as an expansion chamber, and an intermediate portion formed as an injection tube of less cross-section than said chambers, a removable burner head forming a closure at the upper end of the body member, and having an annular wall portion provided with exit openings, a spreader bulb mounted on the burner head and having a peripheral wall diverging from the annular wall of said head and extending across the exit openings therein to provide an annular contracting channel, and a screen mounted within the expansion chamber entirely below the spreader bulb and forming a perforate hood closure for the injection tube.

5. A burner including a body portion formed to provide an injection tube with an entrance chamber at the lower end and an expansion chamber at the upper end, a screen terminating within the expansion chamber and forming a perforate closure for the injection tube, a burner head forming the closure at the upper extremity of the expansion chamber and having an annular skirt portion provided with radially directed exit openings and a conical spreader disposed entirely above the screen and extending across the apertures in position to deflect the combustion mixture from the expansion chamber through the apertures.

PAUL H. HAMILTON.